Figure 1:
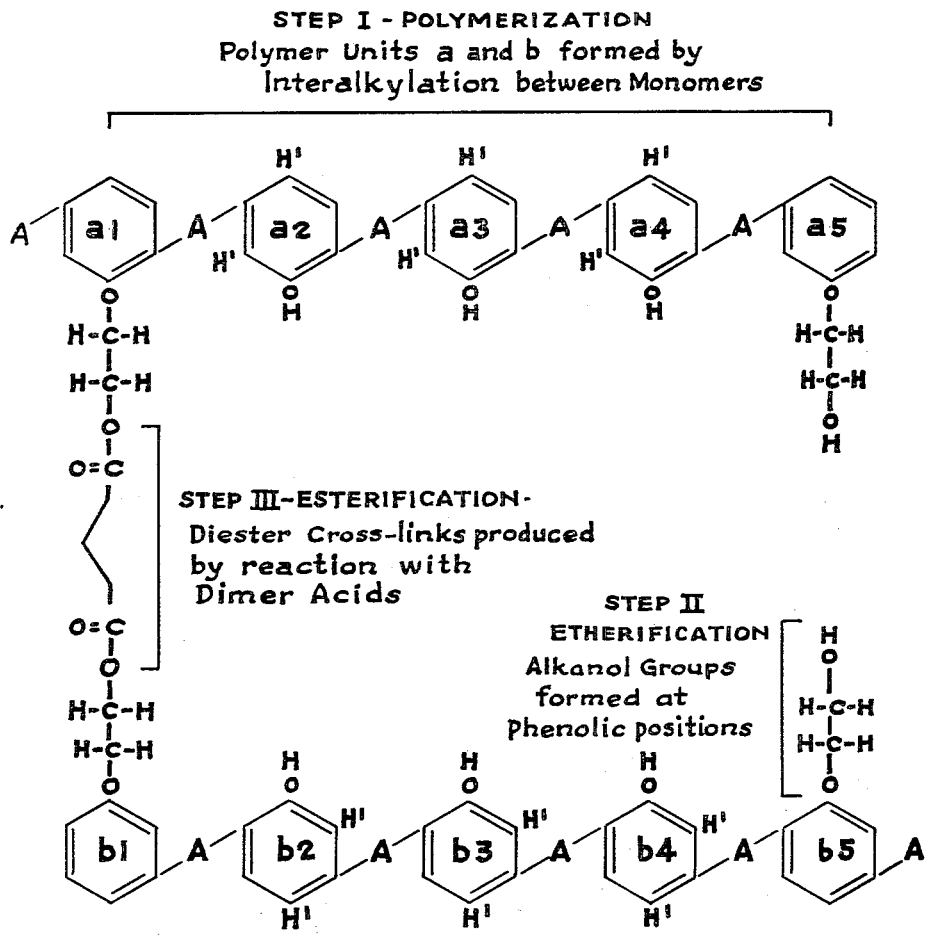

Aug. 14, 1956

W. D. MECUM 2,758,986

CARDANOL-ALKYLENE OXIDE REACTION PRODUCTS
CROSS-LINKED WITH DICARBOXYLIC ACIDS AND
CURED WITH HEXAMETHYLENETETRAMINE

Filed Nov. 28, 1952

Inventor
William D. Mecum
By Wallace and Cannon
Attorneys

United States Patent Office 2,758,986
Patented Aug. 14, 1956

2,758,986

CARDANOL-ALKYLENE OXIDE REACTION PRODUCTS CROSS-LINKED WITH DICARBOXYLIC ACIDS AND CURED WITH HEXAMETHYLENETETRAMINE

William D. Mecum, Sloatsburg, N. Y., assignor to American Brake Shoe Company, Wilmington, Del., a corporation of Delaware Application November 28, 1952, Serial No. 322,860

9 Claims. (Cl. 260—46)

This invention relates to a novel composition of matter in the form of a resin derived from raw or polymeric cashew nut shell liquid and to a method of obtaining the same.

One of the commercial uses for resinous forms of cashew nut shell liquid is as a binder material for composite friction elements such as friction elements for use in conjunction with the brakes of automotive vehicles such as automobiles, trucks, buses and the like. Many of the polymeric and condensation products of cashew nut shell liquid possess varying degrees of hardness and flexibility in a final "set" condition as may be determined by a curing treatment with hexamethylenetetramine or some other compound containing methylene groups such as formaldehyde or the like. However, because of high temperatures developed during service, such cashew binders tend to harden with consequent deleterious effects on friction and wear values, and assume a hardness increase that often results in cracking due to brittleness.

As it occurs in nature, cashew nut shell liquid is principally (around 90%) anacardic acid,

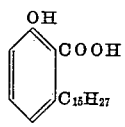

As the name implies, the liquid is obtained by pressing the nut shell of the tree, "Anacardium occidentale," from which the edible "cashew nut" kernel is obtained. Being a pressed vegetable extract, however, an exact composition is difficult to specify. Heating in the presence of acid causes a loss of $CO_2$, and the decarboxylated product thus obtained appears on the market as cardanol, a meta phenol. Primarily, the present invention is concerned with the partial or complete conversion of the raw or preferably polymeric forms of cardanol or decarboxylated cashew nut shell liquid to the hydroxy ethers thereof, followed by a partial or complete esterification of these hydroxy ethers to esters by reaction with various di- or polycarboxylic acids. For most purposes, it is not necessary or even desirable to accomplish complete etherification of the phenolic —OH groups to hydroxy ether groups. With a highly polymeric product, if more than about 50% of the phenolic —OH groups are so converted it is not possible to esterify more than about 80% of the hydroxy ether groups formed with di-carboxylic acids without danger of gelation in the processing. This will readily be appreciated by those familiar with the art of producing highly polymeric resins. Also, the higher the conversion to the hydroxy ethers, the greater will have to be the amount of esterification to avoid the presence of soluble or uncured fractions in the finally cured product.

It may be mentioned that previous literature of a limited nature on the subject refers to certain alkyl ethers of cashew nut shell liquid, such ethers having been prepared, according to the literature, by the reaction of an alkyl or aryl chloride with the phenolic —OH radical in the presence of NaOH. In general, such a process does produce some resistance toward hardening of the cashew product by reducing the possibility of the cashew product to become excessively cross linked by hexamethylenetetramine, formaldehyde, or like curing agent. However, the effect is not complete, and there exists a high percentage of uncured components following a normal curing treatment of this ether product referred to in the literature.

The primary object of the present invention is, therefore, to overcome both the initial hardness and brittleness and, also, the progressive hardening that heretofore has characterized the infusible product obtained by curing cashew nut shell liquid in a conventional manner with hexamethylenetetramine or the like, and to do so in such a manner as to avoid appreciable fractions of soluble and non-curable material in the final product. A further object in this regard is to so plasticize and modify cashew nut shell liquid binders that flexibility and wear properties of the binder are substantially stabilized.

A further object of the present invention is to provide a novel ester product, as obtained from cashew nut shell liquid, having general utility in those manufactures or processes which heretofore have utilized the infusible product of this cashew extract liquid as obtained by a cure with hexamethylenetetramine or the like. In this regard, an additional object of the present invention is to produce an ester derivative of cashew nut shell liquid that will remain relatively soft and flexible when "set" to an infusible state for prolonged periods of time and which will not harden progressively through service by prolonged heating or suddenly in the presence of high temperatures.

Another object of the present invention is to afford methods whereby novel products of cashew nut shell liquid may be successfully prepared.

Since one of the chief uses of the cured product of cashew nut shell liquid is as a binder in different compositions and environments, particuarly those which in use are subjected to heat, the efficiency of the cured product in this regard becomes of importance. In this connection, where the rubbery character of the cured product is of the essence, it has been observed that there is a tendency toward loss of flexibility and resiliency after prolonged exposure to high temperatures, and in most instances this has necessitated the addition of vegetable oil modifiers in order to maintain the desirable binder characteristics. However, the attempt to maintain some of the initial characteristics of the cured cashew oil product in this manner is accompanied by a deleterious effect of its own to the extent that the heat resistance of the composition is lowered. It can be seen, then, that in one sense the use of a vegetable oil modifier is self-defeating.

Therefore, an additional object of the present invention is to increase the range of utility for resinous products of cashew nut shell liquid by means of a novel derivative of the parent cashew nut shell liquid which is characterized by an ability to maintain its initial level of flexibility and resiliency following exposure to high temperatures for prolonged periods of time. Another object in this regard is to dispense as much as possible with the use of oil modifiers in those compositions that depend upon a flexible, rubbery product or derivative of cashew nut shell liquid.

Other objects of the present invention will be apparent to those skilled in the art from a consideration of the practice and composition of matter that is produced by and in accordance with the present invention as disclosed in detail below.

As was noted hereinabove, the present invention is concerned primarily with the conversion of decarboxylated cashew nut shell liquid first to an ether and then to an ester. This decarboxylated cashew extract is believed to be represented principally by the formula

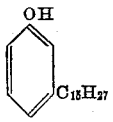

and is readily polymerized under and in accordance with the present invention by heating in the presence of a strong acid as a catalyst, this heating operation also serving to drive off $CO_2$ gas from the carboxylic radical —COOH that is present in the raw cashew nut shell liquid. The polymeric forms of the decarboxylated cashew liquid thus prepared are next reacted with an alkylene oxide to form an alkanol radical on the benzene ring at the position occupied by the phenolic —OH group. This product in turn is reacted with a dimer acid to form ester groups which cross link the cashew molecules. The ester groups thus formed are off the alkanol radical rather than the phenolic group, and the over-all reaction may be diagrammed as follows, monomers only being illustrated for clarity, ethylene oxide being used in this particular instance, and the dimer acid being in the form of a dimer fatty acid:

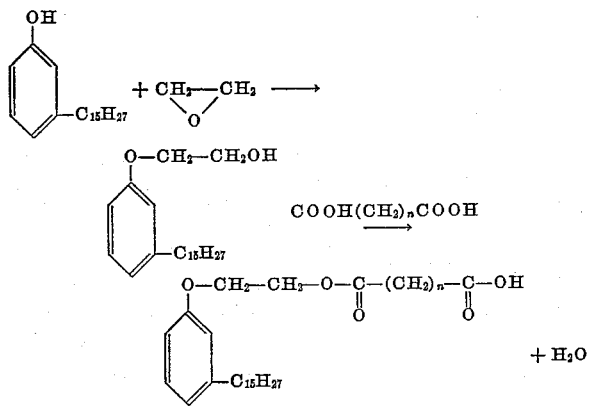

The —COOH group in the half ester molecule thus obtained can react with the alkanol radical on another cashew molecule to cross-link the two molecules, thus:

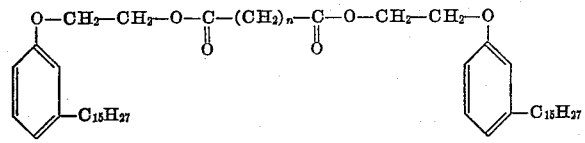

Finally, the ester product is cured, and in the case of a highly polymeric product, as contrasted with the dimer molecule diagrammed immediately above, this can be effected with hexamethylenetetramine which is effective, in a well known manner, to cross-link active ring hydrogen atoms.

The foregoing, outlined as a three-step synthesis, is dependent first upon a polymerization of monomeric cardanol or decarboxylated cashew nut shell liquid. The aliphatic side chain, —$C_{15}H_{27}$ located on the hydrocarbon ring in meta position to the phenolic —OH group, is unsaturated and possesses two double bonds which are probably separated by a methylene (—$CH_2$—) group. Consequently, polymerization, especially if carried out in the presence of a strong acid catalyst, is probably represented by the combined effect of a Diels Alder type polymerization of an interalkylation polymerization. In the case of alkylation between cardanol monomers, a 2, 4 or 6 position ring hydrogen of one cardanol monomer, adds on to one carbon of a double bond in the —$C_{15}H_{27}$ side chain of an adjacent monomer, and the benzene ring from which such hydrogen atom is stripped attaches itself to the other carbon in the double bond. In the case of heat polymerization whereby the two double bonds in the aliphatic side chain become conjugated, the 2, 4 or 6 ring hydrogens might not be involved and consequently a Diels Alder polymerization will result. Regardless of the exact mechanism by which monomeric cardanol, or decarboxylated cashew nut shell liquid, polymerizes through the unsaturated aliphatic side chain in the practice of the present invention, a polymer having a number of monomer units, say about 2 to 10, linked together is preferred since it is not desired to destroy the phenolic characteristics of the product during subsequent reactions with the alkylene oxide and dimer acid.

In Fig. 1 of the drawing accompanying the present disclosure, prolymerization in Step I of ten monomers into two polymer units $a$ and $b$ respectively is illustrated as the result of interalkylation through the aliphatic side chains that are characteristic not only of the cashew nut shell liquid itself but also of the decarboxylated derivative as illustrated in the drawing. This is not to say, of course, as can be appreciated from the above discussion, that this is the only vehicle by which polymerization is accomplished. Step I, therefore, simply produces polymers in which the monomers are linked by common aliphatic side chains, and each of the five monomers in the two polymeric units or groups $a$ and $b$ comprises an intact and chemically unaltered —OH group at this stage of the process.

The second step of the present invention is illustrated in the drawings as Step II and consists of condensing an alkylene oxide compound at the phenolic position to thereby form an alkanol group attached to the carbon ring. There is thus formed a phenoxy-alkanol compound, and it will be observed in this connection that only four of the ten possible phenolic positions present for reaction are thus provided with alkanol groups. In other words, four moles of alkylene oxide (ethylene oxide in the illustration) are reacted with ten moles of phenolic —OH, that is, ten cardanol monomers to produce corresponding phenoxy-alkanol compounds. After this etherification with an alkylene oxide, the two polymeric units $a$ and $b$ are still separate entities and four only of the monomers are etherified.

The third and final step of the process is to link the polymeric units $a$ and $b$. This is illustrated as Step III in the drawings and consists of reacting a dimer acid in the presence of the two polymeric units whereby the two —COOH of the acid attach themselves to an opposite pair of alkanol groups (water being produced) to link up the polymeric units $a$ and $b$. It will be recognized that there is presented the possibility of such a linkage at either end of the polymer units $a$ and $b$; however, only one mole of dimer acid is used so that esterification, in stead of being complete, is only 50%.

The complete molecule in Fig. 1 represents the desired ester product, and in the form shown can be looked upon as 10–4–1 molecule; ten cardanol monomers polymerized by interalkylation; four alkanol groups attached at phenolic positions on four of the monomers; and one dimer acid molecule to form a single ester cross-link. Thus, there has been a 40% etherification and a 50% estertification. This 10–4–1 molecule is fairly typical of Example 16 (see below).

If two of the 10–4–1 molecules illustrated in Fig. 1 are linked by another mole of dimer acid, there is then produced a 20–8–3 molecule in which 40% of the phenolic —OH groups have been etherified and 75% of the resulting alkanol groups have been esterified. Likewise, if two such 20–8–3 molecules are linked by a dimer acid molecule, the product is a 40–16–7 molecule with 40% etherification and 87.5% esterification.

Regardless of the extent of esterification, 12 ring hydrogens for each ten cashew monomers are potentially reactive with methylene groups, as obtained from "hexa" or formaldehyde for instance, for the final cure. Thus, only those monomers in which the —OH group has been converted to the phenoxy alkanol group or phenoxy ester group will be devoid of HCHO or "hexa" reactive ring hydrogens. In the drawings, these unreactive monomers for the 10–4–1 molecule would be $a1$, $a5$, $b1$, and $b5$, and only the $a2$, $a3$, $a4$, $b2$, $b3$, and $b4$ monomers can be cross-linked by methylene groups (—$CH_2$—) during the final curing operation with compounds capable of furnishing methylene groups.

In the actual practice of the present invention I first heat treat cashew nut shell liquid to form decarboxylated polymers containing from about 3 to about 10 or more monomer units. This product may have a viscosity of from about 500 to about 10,000 poises at 25° C. and a refractive index of from about 1.5300 to about 1.5425 at 25° C. See Examples A, B, and C below.

I next react this polymeric product, after stripping off volatile products and cooling to about 140° C., with from 0.25 to 0.75 gm. moles of an alkylene oxide such as ethylene or propylene oxide on the basis of one mole of cashew monomer, or about 300 gms. This is done under such conditions that there is formed substantially only the alkanol mono ether of the cashew product.

There is next reacted, under proper esterification conditions, from 0.25 to 0.75 gm. moles of —COOH derived from a long-chain dimer fatty acid for each gram mole of alkyleneoxide previously reacted. After esterification is substantially complete, the product is stripped at about 265° C. and under reduced pressure, around 40 mms. of Hg absolute. The resulting product will have a viscosity of from 1.5 to 3.0 times that of the cashew base depending on the ratio of ester groups formed from the alkanol groups.

If the following ratios are used and the final ester product cured with about 6.0% hexamethylenetetramine a flexible rubbery ester derivative of cashew nut shell liquid will result.

1.0 gm. mole phenolic OH groups derived from cashew nut shell liquid in polymeric form.
0.4 gm. moles of ethylene or 1,2 propylene oxide.
0.2 gm. mole of —COOH derived from a dimerized 18 carbon unsaturated fatty acid.

If on the other hand the ratios shown below are used, the product, cured in a similar manner, will be much harder and more brittle although not as much so as the straight cashew polymer cured with a similar amount of hexamethylenetetramine.

1.00 gm. moles phenolic OH groups derived from cashew nut shell liquid in polymeric form.
0.26 gm. moles of ethylene or 1,2 propylene oxide.
0.20 gm. moles of —COOH groups derived from a dimerized 18 carbon unsaturated fatty acid.

In Examples 1 to 20 there is disclosed the effect of varying component ratios with three polymeric cashew products having viscosities of about 1100 poises, about 9500 and about 1600 poises respectively at 25° C. These three polymeric products, hereafter referred to as Examples A, B and C respectively, are prepared in the following manner:

EXAMPLE A

Crude cardanol _____ gms__ 7,200
Toluol (entrains $H_2O$ and impurities) _____ mls__ 400
$H_2SO_4$ 15 } mixed (catalyst) _____ gms__ 116
Ethanol 20 }

All components are charged into a suitable reactor furnished with an agitator, a condenser, a receiver for condensed volatile products and a vacuum source. Heat is applied and the temperature increased to about 315° C. in about 100 minutes. The temperature is held between 310 and 320° C. for about 55 minutes. During this processing the naturally present alkalinity of the decarboxylated cashew nut shell liquid is neutralized, the evil smelling sulfur and nitrogen compounds are carried over into the receiver by entrainment and condensation and at the higher temperatures the monomeric cardanol becomes polymeric. After holding for 55 minutes at from 310–320° C., preferably at about 315° C., vacuum is applied slowly and the pressure is reduced with heat off until it reaches about 50 mms. absolute at 290 to 300° C. The product is then cooled under vacuum or a $CO_2$ atmosphere until the temperature drops to about 140° C. At 25° C., Example A has a viscosity of about 1100 poises and a refractive index of about 1.5380 as compared with a viscosity of 3–5 poises and a refractive index of 1.5163 for the raw cashew nut shell liquid. This product is used in preparing Examples 1, 2, 3 and 4 as will be shown below.

EXAMPLE B

| | Pounds |
|---|---|
| Crude cardanol | 206.5 |
| Toluol | 9.9 |
| $H_2SO_4$ 1.5 } mixed (catalyst) | 3.0 |
| Ethanol 1.5 } | |

The components in Example B are processed in the same manner as Example A except that instead of holding for 55 minutes at 310–320° C. the reaction is held for 80 minutes as follows:

| | Minutes |
|---|---|
| 300–310° C. | 5 |
| 310–335° C. | 25 |
| 335–326° C. | 20 |
| 326–320° C. | 30 |

After this heat cycle the product is vacuum stripped and handled the same as Example A. At 25° C. Example B has a viscosity of 9500 poises and a refractive index of 1.5421. This product is used in preparing Examples 5, 6, 7 and 8 as will be shown below.

EXAMPLE C

This product is prepared in the same way as Examples A and B except that the heat treatment is carried out in such a way as to obtain at 25° C. a viscosity of 1650 poises and a refractive index of 1.5400. Except for somewhat longer heating at 315° C. this product is prepared in a manner similar to Example A. Thus, Example C is prepared in the following manner.

Crude cardanol _____ gms__ 6000
Catalyst ($H_2SO_4$ 43%—EtOH—57%) _____ gms__ 90
Toluol _____ mls__ 360

*Process*

| Time, minutes | Temperature, °C. | Remarks |
|---|---|---|
| 0 | 25 | Charge of all components. |
| 5 | 25 | Heat on. |
| 85 | 300 | |
| 115 | 315 | |
| 205 | 315 | Reduce pressure strip. |
| 220 | 295 | 30 mm. absolute. |
| 225 | 285 | Cool under vacuum. |
| 275 | 130 | Replace vacuum with $CO_2$, pour. |

A yield of 5805 gms. of product is obtained having a viscosity of 1650 poises at 25° C. and a refractive index of 1.5400 at 25° C. This product is used in preparing Examples 9 to 20 inclusive as will be shown below.

In preparing Examples 1, 2, 3, and 4, there is used the polymeric product obtained by Example A and this polymer is reacted with 1,2 propylene oxide and dimer fatty acids in the proportions shown below in Table 1.

Table 1

[Mole ratios shown are before reaction]

| Ex. No. | Product from example A | | Propylene oxide | | Dimer fatty acids | |
| --- | --- | --- | --- | --- | --- | --- |
| | Percent | Mole ratio Phenolic OH | Percent | Mole ratio | Percent | Mole ratio COOH |
| 1 | 78 | 1.000 | 6 | .400 | 16 | .205 |
| 2 | 80 | 1.000 | 4 | .258 | 16 | .200 |
| 3 | 80 | 1.000 | 6 | .388 | 14 | .175 |
| 4 | 82 | 1.000 | 4 | .252 | 14 | .170 |

Preferably all of these examples are prepared in about the same manner and by the processes to be described hereinbelow. Although the reaction with alkylene oxide is preferably carried out at a temperature of about 140° C. at atmospheric pressure, higher or lower temperatures may be employed with or without elevated or reduced pressures. Similarly, while triethylamine is preferably used as a catalyst for the reaction of the alkylene oxide with the cashew nut shell liquid other tertiary amines or alkaline catalysts may be employed. Esterification of the alkanol groups formed in the foregoing reaction is preferably conducted in the presence of an aromatic hydrocarbon as an entraining agent for the water formed and at temperatures of around 250° C., but higher or lower temperatures may be employed and the entraining agent omitted.

In the reaction of the alkylene oxide with the polymeric cashew, the use of a solvent such as toluol or xylol may be employed to reduce the viscosity of the polymeric cashew. There is some advantage in doing this when the polymeric cashew product is of high viscosity.

EXAMPLE 1

| | Grams |
| --- | --- |
| Product from Example A | 1,560 |
| Triethylamine (catalyst) | 20 |
| Propylene oxide 1,2 | 120 |
| Dimerized fatty acids | 320 |
| Toluol | 60 |

The product from Example A is charged into a three necked flask equipped with an agitator, a reflux condenser and a vacuum source. After heating to 140° C. in 20 minutes the reaction vessel is evacuated to a pressure of 40 mms. of Hg. absolute. The system is then sealed off from the pump and the atmosphere, and the catalyst, triethylamine, is added in such a manner that no air is introduced into the sealed system. The triethylamine is rapidly absorbed as evidenced by a rapid pressure drop. Propylene oxide is then fed into the system rapidly at first until the pressure reaches atmospheric and then at such a rate that the pressure is maintained at substantially atmospheric. The reaction is exothermic, but if the system is free from air or other non-condensable gases, and the condenser of sufficient capacity, the reflux return from the condensing propylene oxide is sufficient to maintain the temperature between about 140 and 150° C. After all of the propylene oxide has been added, the reaction is continued until a pressure drop to about 100 mms. of Hg. absolute is reached. This insures a substantially complete reaction so that no unreacted propylene oxide is dissolved in the product.

The system is next opened to the air and a mixture of dimer fatty acids, 320 gms., and toluol, 60 gms., is added to the product in the reactor. The condenser take-off is opened to a decanter and receiver system so that condensing toluol is returned to the reactor and separated water removed from the system.

The contents of the reactor are heated from 140° C. to 265° C. in about 60 minutes. Water from the esterification of the alkanol groups and the carboxyl groups starts coming off at about 180° C. After holding for 85 minutes at 265° C., the esterification is practically complete as evidenced by the recovery of 19.0 gms. of water. The pressure is next reduced to strip off the toluol dissolved in the resin, and when an absolute pressure of 50 mms. of Hg. at 274° C. is reached, the product is cooled under vacuum to 170° C. and then removed from the reactor. A product yield of 1985 gms. is obtained having a viscosity of 1900 poises at 25° C. The product from Example 1 may be cured with 6.0 percent hexamethylenetetramine at 160° C. The cured product is tough, flexible and somewhat rubbery in character. It is infusible, insoluble in common solvents and shows excellent heat resistance up to 350° C. It did not show excessive hardening when subjected to a temperature of 315° C. for one hour followed by heating for one hour at 350° C. Example A when cured at 160° C. with a similar amount of hexamethylenetetramine was hard and brittle and not at all rubbery. As mentioned above, Example A represents a straight cashew polymer having a viscosity of 1100 poises at 25° C. with all phenolic OH groups in their natural state.

In preparing Example 2, the following selected components are reacted in substantially the same manner as in Example 1.

| | | |
| --- | --- | --- |
| Product from Example A | gms | 1,600 |
| Triethylamine | gms | 20 |
| Propylene Oxide | gms | 80 |
| Dimer Fatty Acids | gms | 320 |
| Toluol | mls | 60 |

The resulting product, 1887 gms., has a viscosity of 2100 poises at 25° C. It cures rapidly to a hard, horny and somewhat brittle product when cured with 6.0 percent hexamethylenetetramine at 160° C. While considerably harder and less flexible than Example 1 cured under the same conditions, it is nevertheless not nearly as hard and brittle as Example A cured under the same conditions.

EXAMPLE 3

In preparing Example 3, the following selected components are reacted in essentially the same manner as in Example 1.

| | | |
| --- | --- | --- |
| Product from Example A | gms | 1,600 |
| Triethylamine | gms | 20 |
| Propylene Oxide | gms | 120 |
| Dimer Fatty Acids | gms | 280 |
| Toluol | mls | 60 |

The resulting product, 1990 gms., has a viscosity of 1800 poises at 25° C. Within the limits of experimental error it is about equal to Example 1 in flexibility and heat resistance.

EXAMPLE 4

In preparing Example 4 the following selected components are reacted in about the same manner as in Example 1.

| | | |
| --- | --- | --- |
| Product from Example A | gms | 1,640 |
| Triethylamine | gms | 20 |
| Propylene Oxide | gms | 80 |
| Dimer Fatty Acids | gms | 280 |
| Toluol | mls | 60 |

The resulting product, 1984 gms., has a viscosity of 2050 poises at 25° C. When cured in the same manner as Examples 1, 2 and 3 its properties are essentially the same as Example 2 except that it has higher tensile and is somewhat more flexible.

In preparing Examples 5, 6, 7 and 8 the polymeric cashew product obtained from Example B is used, having a viscosity of about 9500 poises at 25° C. This product is reacted with propylene oxide and dimer fatty acids in the proportions shown in Table II below.

Table II

[Mole ratios shown are before reaction]

| Ex. No. | Product from example B | | 1,2 Propylene oxide | | Dimer fatty acids | |
|---|---|---|---|---|---|---|
| | Percent | Mole ratio phenolic OH | Percent | Mole ratio | Percent | Mole ratio COOH |
| 5 | 78 | 1.000 | 6 | .400 | 16 | .205 |
| 6 | 80 | 1.000 | 4 | .258 | 16 | .200 |
| 7 | 80 | 1.000 | 6 | .388 | 14 | .175 |
| 8 | 82 | 1.000 | 4 | .252 | 14 | .170 |

These component proportions are reacted in the same manner as detailed in Example 1, and the same proportion of triethylamine as a catalyst is used as well as the same proportion of toluol as a water entraining agent during the esterification reaction.

Examples 5, 6, 7 and 8 differ from the corresponding Examples 1, 2, 3 and 4 respectively in the following principal respects:

(1) Much higher viscosity.
(2) Better tensile and elongation.
(3) Better heat resistance.

In preparing Examples 9 to 20 inclusive I use the polymeric cashew product described under Example C. The weight and molar proportions of the components used are shown below in Table III.

Table III

| Ex. No. | Product from example C | | Propylene oxide | | Ethylene oxide | | Dimer fatty acids | |
|---|---|---|---|---|---|---|---|---|
| | Wt. Percent | Moles phenolic OH | Wt. percent | Moles | Wt. percent | Moles | Wt. percent | Moles—COOH |
| 9 | 96.45 | 1.000 | | | 3.55 | .250 | | |
| 10 | 93.17 | 1.000 | | | 6.83 | .500 | | |
| 11 | 90.08 | 1.000 | | | 9.92 | .750 | | |
| 12 | 83.40 | 1.000 | | | 6.12 | .500 | 10.48 | .125 |
| 13 | 75.50 | 1.000 | | | 5.54 | .500 | 18.96 | .250 |
| 14 | 68.95 | 1.000 | | | 5.05 | .500 | 26.00 | .375 |
| 15 | 78.00 | 1.000 | 6.0 | .400 | | | 16.0 | .205 |
| 16 | 79.15 | 1.000 | | | 4.65 | .400 | 16.20 | .205 |
| 17 | 73.56 | 1.000 | | | 4.33 | .400 | 22.11 | .300 |
| 18 | 95.30 | 1.000 | | | 4.70 | .333 | | |
| 19 | 82.30 | 1.000 | | | 4.00 | .333 | 13.70 | .167 |
| 20 | 77.04 | 1.000 | | | 3.76 | .333 | 19.20 | .250 |

In preparing these examples, the alkylene oxide is reacted under the same conditions as described for the reaction of the propylene oxide in Example 1 except that the ethylene oxide is introduced into the system as a gas instead of a liquid as in the case of propylene oxide. In preparing these examples, the same proportion of triethylamine is used as a catalyst as in Example 1. Where esterification with dimer fatty acids derived from 18 carbon unsaturated acids is indicated in Table III, the same esterification process as described in Example 1 is used. In general, the higher the proportion of alkanol groups esterified the longer the time will be to complete the esterification.

In Example 14, where 50 percent of the phenolic —OH groups have been converted to phenoxy ethanol groups and 75 percent of these are esterified with dimer acids, the resulting product is nearly a gel. With lower ratios of phenoxy ethanol groups, 75 percent or more of these groups can be readily esterified without danger of gelation.

In general, where no cross linking esterification is carried out as in Examples 9, 10, 11 and 18, the reaction of more than about .333 moles of alkylene oxide per mole of cashew phenolic —OH results in soft non-rubbery products when cured with hexamethylenetetramine. Example 9 was rather soft but brittle, Example 10 was very soft and slightly tacky with very low tensile and Example 11 did not cure at all.

Table IV shows a comparison of certain physical properties of Examples 1–20, including Example C without modification.

PHYSICAL DATA ON EXAMPLES

Table IV

| Ex. No. | Visc. poises, 25° C. | Tensile, lbs. | Volatiles, percent | | | Acetone extracts, percent | | |
|---|---|---|---|---|---|---|---|---|
| | | | Stretch, percent | 315° C. | 350° C. | No heat | 315° C. | 350° C. |
| 1 | 2,009 | 253 | 20 | 7.0 | 2.6 | 18.2 | 9.9 | 15.3 |
| 2 | 2,208 | 720 | 14 | 5.8 | 2.0 | 11.5 | 5.9 | 10.1 |
| 3 | 1,866 | 248 | 20 | 8.2 | 1.0 | 18.6 | 10.0 | 13.4 |
| 4 | 2,160 | 775 | 10 | 5.6 | 2.6 | 12.0 | 4.8 | 9.8 |
| 5 | 19,520 | 367 | 39 | 5.1 | 1.9 | 14.5 | 10.5 | 15.1 |
| 6 | 44,800 | 1,480 | 21 | 3.6 | 1.4 | 9.5 | 7.6 | 11.7 |
| 7 | 17,000 | 695 | 44 | 4.8 | 1.6 | 14.2 | 11.3 | 16.2 |
| 8 | 17,840 | 1,580 | 21 | 3.9 | 1.5 | 10.4 | 8.2 | 12.2 |
| C | 1,630 | 3,440 | 0 | 2.9 | .9 | 2.4 | 2.3 | 6.7 |
| 9 | 3,140 | 1,320 | 10 | 5.5 | 1.2 | 11.4 | 11.0 | 19.4 |
| 10 | 2,560 | 35 | 100 | 14.8 | 1.7 | 53.8 | 40.5 | 47.2 |
| 11 | 1,696 | (1) | (1) | (1) | (1) | (1) | (1) | (1) |
| 12 | 2,560 | 206 | 40 | 8.2 | 1.1 | 31.4 | 14.8 | 18.7 |
| 13 | 5,760 | 180 | 46 | 7.1 | 1.2 | 21.6 | 12.8 | 17.6 |
| 14 | 50,000+ | 228 | 48 | 5.9 | 1.0 | 18.3 | 13.0 | 14.3 |
| 15 | 2,384 | 366 | 31 | 6.9 | 1.4 | 17.9 | 10.4 | 12.7 |
| 16 | 2,280 | 700 | 37 | 5.6 | 1.0 | 13.9 | 7.3 | 11.5 |
| 17 | 5,000 | 369 | 49 | 5.9 | 1.0 | 17.1 | 9.3 | 10.7 |
| 18 | 4,096 | 780 | 32 | 6.8 | 1.8 | 21.6 | 23.7 | 34.1 |
| 19 | 5,920 | 654 | 20 | 5.2 | 1.0 | 14.5 | 10.0 | 13.6 |
| 20 | 10,400 | 646 | 21 | 5.2 | .8 | 14.1 | 9.6 | 13.4 |

[1] Did not cure—no data available.

Except where cost or availability are critical factors, I prefer to use ethylene oxide rather than 1,2 propylene oxide. It can be seen by referring to Table IV, Examples 15 and 16, that for the same molar proportions the use of ethylene oxide, Example 16, results in higher tensile, greater elongation and lower high heat volatiles and extracts than when propylene oxide is used as in Example 15. However, it is not to be understood from this that these alkylene oxides alone can be used since butylene oxide, butadiene oxide and tetrahydrofuran might also be used in the etherification step.

Where the product is to be cured with hexamethylenetetramine and used as a bond for friction materials such as brake lining, I prefer to use a product such as Example 16 which has maximum heat resistance for a product which is rubbery and flexible. In this connection, it will be recalled that attention was earlier directed to the fact that the molecule illustrated in Fig. 1 is fairly typical of the product produced according to Example 16.

At high levels of alkylene oxide reacted, esterification tends to reduce elongation but improves high heat extracts markedly and high heat volatiles to some extent. At low levels of alkylene oxide, reacted esterification with dimer acids shows less improvement in high heat volatiles and extracts.

As can be observed from Examples 9, 10, and 11, softening and plasticizing can be obtained through the action of an alkylene oxide alone as distinguished from the combined actions of alkylene oxide and dimer acid, However, it should be called to attention that such products are inferior from the standpoint of oil and solvent resistance and freedom from extractible matter as compared to those products wherein a substantial proportion of the alkanol groups have been esterified with dimer acids. In other words, depending upon the conditions of usage, desired degree of the particular characteristic in the product, and the like factors, either alkylene oxides alone or mixtures thereof with dimer acids may be used for reducing the hardness and increasing the flexibility of cured polymeric decarboxylated cashew nut shell liquid.

Dimer acids in the form of dimer fatty acids are not essential in every instance. Thus, a tough, leathery product having good physical properties with the exception of a somewhat high viscosity can be prepared exactly as in Example 19 except that maleic acid, an unsaturated four carbon dimer acid, is substituted for a fatty acid. The higher viscosity is the result of cross-linking through the conjugated double bond system in the maleic acid.

Use of sebacic along the procedural lines of Example 16 produces a product that is somewhat harder and less flexible and which has a higher percentage of extracts. Succinic acid can be used in a similar manner to prepare a product having similar characteristics.

Generally, any of the dimerized fatty acids can be used for the cross-linking esterifying step, but of course the more commonly used acids are preferred, that is fatty acids having from 2 to 26 methylene groups between the two carboxyl groups.

I claim:

1. As a composition of matter, a resin adapted for use as a binder material and comprising monomeric units of cardanol polymerized through the aliphatic side chains thereof to form polymeric units having not more than about 50 per cent of the phenolic —OH groups converted to alkanol groups which are attached to the monomeric units at the phenoxy positions thereof, and wherein at least some, but not all of the alkanol groups are esterified by a polycarboxylic acid.

2. As a composition of matter, a phenolic resin adapted for use as a binder material and comprising polymeric units consisting of not more than about ten cardanol monomeric units polymerized through aliphatic side chains and wherein not more than about 50 per cent of the phenoxy valences present in the cardanol material are satisfied by alkanol groups to form phenoxy-alkanol groups at the phenolic —OH positions and to leave a substantial number of unreacted phenolic —OH groups behind for subsequently participating in a cure of the product, adjacent ones of said polymeric units being cross-linked by esterification of the alkanol groups thereof with a polycarboxylic acid.

3. As a composition of matter, a phenolic resin comprising polymeric units having about three to about ten cardanol units polymerized through the side chains thereof and having not over about 50 per cent of the phenoxy valences present satisfied by a corresponding number of alkanol groups to form phenoxy-alkanol groups at the phenolic —OH positions, and wherein some, but not all of the alkanol groups in respectively different polymeric units are esterified by reaction with a polycarboxylic acid to link up adjacent polymeric units and leave unreacted phenolic —OH groups present for a subsequent cure of the resin.

4. As a composition of matter, a resin comprising decarboxylated anacardic acid polymerized through the aliphatic side chains of the acid to form linear polymeric units, not more than about 25 to 50 per cent of the phenoxy valences present in such polymeric units being satisfied by monovalent alkanol groups thus leaving behind unreacted phenolic —OH groups for subsequently participating in a cure of the product, and adjacent ones of said linear polymeric units being cross-linked by esterification of the alkanol groups thereof with a dicarboxylic acid, about 25 to 75 per cent of the alkanol groups present in said adjacent polymeric units being thus cross-linked by esterification.

5. A method for preparing resins comprising polymerizing cardanol monomers through the aliphatic side thereof to form linear polymeric units, reacting the polymeric units thus formed with an alkylene oxide to form phenoxy-alkanol groups at not more than about 50 per cent of the phenolic —OH positions on the monomeric units, and then esterifying to not more than about 75 per cent the product from the second step with a dicarboxylic acid to cross-link the polymers.

6. A method according to claim 5 in which only about 25 to about 50 per cent of the phenolic —OH positions present are replaced by phenoxy-alkanol groups and in which the esterification is only about 25 to 75 per cent complete.

7. A method for preparing cross-linked resins from cardanol comprising, polymerizing the cardanol material through its side chains to form linear polymeric units, reacting the polymeric units thus produced with alkylene oxide to replace the hydrogen atoms in not over about 50 per cent of the phenolic —OH groups with alkanol groups so that there remains a substantial proportion of unreacted phenolic —OH groups for subsequently participating in a cure of the product, and then esterifying some but not all of the alkanol groups in adjacent ones of said polymeric units with a dicarboxylic acid.

8. A method for preparing cross-linked resins from cardanol comprising, polymerizing the cardanol material through it side chains to form polymer units comprising about three to ten monomeric units of cardanol, reacting the polymer units with an alkylene oxide to replace not over about half of the replaceable hydrogen in the monovalent phenolic —OH groups with monovalent alkanol groups, and then esterifying about half of the alkanol groups with a polycarboxylic to cross-link said polymer units.

9. A method for preparing cross-linked resins from cardanol comprising, polymerizing the cardanol material through its side chains to form separate linear polymer units, reacting the polymer units with an alkylene oxide to displace the replaceable hydrogen in not over about half of the phenolic —OH groups with alkanol groups, and then linking adjacent ones of said linear polymer units by esterification of some but not all of the alkanol groups with a polycarboxylic acid.

References Cited in the file of this patent

UNITED STATES PATENTS

| 2,317,607 | Harvey | Apr. 27, 1943 |
| 2,454,542 | Bock et al. | Nov. 23, 1948 |
| 2,610,955 | De Groote et al. | Sept. 16, 1952 |
| 2,665,266 | Wasserman | Jan. 5, 1954 |